United States Patent
Hasegawa et al.

(10) Patent No.: US 7,167,341 B2
(45) Date of Patent: Jan. 23, 2007

(54) THIN FILM MAGNETIC HEAD HAVING LOWER AUXILIARY MAGNETIC POLE ON LOWER MAGNETIC POLE LAYER

(75) Inventors: Minoru Hasegawa, Kawasaki (JP); Yoshinori Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 10/619,859

(22) Filed: Jul. 15, 2003

(65) Prior Publication Data

US 2005/0013045 A1 Jan. 20, 2005

Related U.S. Application Data

(63) Continuation of application No. PCT/JP01/00191, filed on Jan. 15, 2001.

(51) Int. Cl.
*G11B 5/147* (2006.01)
(52) U.S. Cl. ....................... 360/126
(58) Field of Classification Search .......... 360/126
See application file for complete search history.

(56) References Cited

U.S. PATENT DOCUMENTS 6,549,370 B1 * 4/2003 Kamijima .............. 360/126
6,597,543 B1 * 7/2003 Saitho et al. ........... 360/126
6,854,175 B2 * 2/2005 Sasaki .................. 360/125

FOREIGN PATENT DOCUMENTS

| JP | 4-353609 | 12/1992 |
|---|---|---|
| JP | 6-314414 | 11/1994 |
| JP | 7-129930 | 5/1995 |
| JP | 8-138211 | 5/1996 |
| JP | 11-213329 | 8/1999 |
| JP | 11-339223 | 12/1999 |
| JP | 11-353614 | 12/1999 |
| JP | 2000-011319 | 1/2000 |
| JP | 2001-023116 | 1/2002 |

* cited by examiner

*Primary Examiner*—Robert S. Tupper
(74) *Attorney, Agent, or Firm*—Greer, Burns & Crain, Ltd.

(57) ABSTRACT

A depression is formed on the surface of a lower magnetic pole layer in a thin film magnetic head. A lower auxiliary magnetic pole is defined in the lower magnetic pole layer between the depression and a medium-opposed surface of a head slider. The depression is filled up with a non-magnetic material. When the thin film magnetic head is to be formed, no magnetic layer is formed on the lower magnetic pole layer for forming the lower auxiliary magnetic pole. A dry process such as sputtering and vapor-deposition can be employed to form the lower magnetic pole layer, so that a wider choice can be provided for the material of the lower magnetic pole layer and the lower auxiliary magnetic pole.

8 Claims, 7 Drawing Sheets

THIN FILM MAGNETIC HEAD HAVING LOWER AUXILIARY MAGNETIC POLE ON LOWER MAGNETIC POLE LAYER

This is a continuation of International PCT Application No. PCT/JP01/00191, filed Jan. 15, 2001.

BACKGROUND OF THE INVENTION

1. Field of the Invention

The present invention relates to a thin film magnetic head often employed in a magnetic recording medium drive such as a magnetic disk drive and a magnetic tape drive, and to a method of making the same. In particular, the invention relates to a thin film magnetic head comprising a lower magnetic pole layer extending rearward from the front end exposed at a medium-opposed surface, an upper magnetic pole opposed to the lower magnetic pole layer, and a lower auxiliary magnetic pole protruding toward the upper magnetic pole from the upper surface of the lower magnetic pole layer at the front end of the lower magnetic pole layer, and to a method of making the same.

2. Description of the Prior Art

Japanese Patent Application Publication 11-353614 discloses, for example, a lower auxiliary magnetic pole standing from the front end of a lower magnetic pole layer toward an upper magnetic pole so as to define a so-called gap depth of the thin film magnetic head. The lower auxiliary magnetic pole greatly contributes to establishment of a smaller gap depth irrespective of the extent of the upper magnetic pole opposed to the lower auxiliary magnetic pole. If the gap depth can be set smaller in this manner, the magnetic flux is allowed to be exchanged between the upper and lower magnetic poles so as to efficiently leak out of the medium-opposed surface of a head slider, for example. A stronger magnetic field for recordation can be realized in an efficient manner.

A non-magnetic material piece may be embedded in the lower magnetic pole layer. The non-magnetic material piece is employed to define the rear end of the lower auxiliary magnetic pole within the lower magnetic pole layer. A depression is formed on the upper surface of the lower magnetic pole layer prior to the embedment of the non-magnetic material piece. A plating process is utilized to form the depression. A magnetic material is allowed to deposit on the upper surface of the lower magnetic pole layer around a photoresist film patterning the shape of the depression in the plating process. After removal of the photoresist film, the depression is filled up with a non-magnetic material. However, when the plating process is to be employed to form the lower auxiliary magnetic pole, the lower auxiliary magnetic pole should suffer from less choice of the magnetic material.

SUMMARY OF THE INVENTION

It is accordingly an object of the present invention to provide a thin film magnetic head contributing to realization of a process other than a plating process to form a lower auxiliary magnetic pole on the surface of a lower magnetic pole layer.

According to a first aspect of the present invention, there is provided a thin film magnetic head comprising: a lower magnetic pole layer extending rearward from the front end exposed at a medium-opposed surface; a depression located on the upper surface of the lower magnetic pole layer; a lower auxiliary magnetic pole defined in the lower magnetic pole layer between the medium-opposed surface and the depression; a non-magnetic mass embedded in the depression; and an upper magnetic pole opposing the front end to the lower auxiliary magnetic pole at the medium-opposed surface.

When the thin film magnetic head is to be formed, the lower magnetic pole layer may first be deposited on a substratum. The depression is then formed on the surface of the lower magnetic pole layer. For example, a photoresist film may be formed on the surface of the lower magnetic pole layer. The photoresist film may pattern the shape of the depression. The lower magnetic pole layer is thereafter subjected to an ion milling process, for example. The depression serves to define the rear end of the lower auxiliary magnetic pole. The depression may be filled with a non-magnetic material. The non-magnetic material may be a resin material suitable for a photoresist, a metallic material containing at least one material selected from a group consisting of Cu, Ag, Au and Pt. It should be noted that the upper magnetic pole may include an upper magnetic pole layer and an upper auxiliary magnetic pole connected to the front end of the upper magnetic pole layer.

If the lower auxiliary magnetic pole is engraved out of the formed lower magnetic pole layer in the aforementioned manner, no magnetic layer is additionally formed on the lower magnetic pole layer for forming the lower auxiliary magnetic pole. A dry process such as sputtering and vapor-deposition can be employed to form the lower magnetic pole layer in addition to a wet process such as plating, so that choice of the material can be widened for the lower magnetic pole layer and the lower auxiliary magnetic pole.

When the non-magnetic material is to be filled within the depression, a method of making a thin film magnetic head may comprise: filling the depression with a resin material; forming a protection film over the surface of the lower magnetic pole layer; and subjecting an exposed surface of the protection layer to a flattening process so as to expose the resin material in the depression. Alternatively, the method of making may include: forming a non-magnetic metallic film over the surface of the lower magnetic pole layer so as to fill the depression with the non-magnetic material of the non-magnetic metallic film; and subjecting an exposed surface of the non-magnetic metallic film to a flattening process so as to expose the surface of the lower magnetic pole layer around the depression. With these processes, the non-magnetic material can be filled in a relatively facilitated manner. Electrolyte plating or non-electrolyte plating can be employed to form the non-magnetic metallic film.

According to a second aspect of the present invention, there is provided a thin film magnetic head comprising: a lower magnetic pole layer extending rearward from the front end exposed at a medium-opposed surface; a non-magnetic region defined in the lower magnetic pole layer at a position spaced rearward from the medium-opposed surface on the basis of a non-magnetic element doped within the lower magnetic pole layer; a lower auxiliary magnetic pole defined in the lower magnetic pole layer between the medium-opposed surface and the non-magnetic region; and an upper magnetic pole opposing the front end to the lower auxiliary magnetic pole at the medium-opposed surface.

When the thin film magnetic head of the type is to be formed, the lower magnetic pole layer may first be deposited on a substratum. Non-magnetic element ions are doped into the lower magnetic pole layer by an ion implantation method. The doped non-magnetic element ions serve to define the rear end of the lower auxiliary magnetic pole within the lower magnetic pole layer. Since the lower auxiliary magnetic pole is established within the lower magnetic pole layer, no magnetic layer is additionally formed on the lower magnetic pole layer for forming the lower auxiliary magnetic pole. A dry process such as sputtering and vapor-deposition can be employed to form the lower magnetic pole layer in addition to a wet process such as plating, so that choice of the material can be widened for the lower magnetic pole layer and the lower auxiliary magnetic pole.

The thin film magnetic head of the type as described above may be incorporated in a magnetic recording medium drive such as a magnetic disk drive managing recordation of information on a magnetic disk, a magnetic tape drive managing recordation of information on a magnetic tape, and the like. The magnetic disk drive can be represented by a hard disk drive (HDD).

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
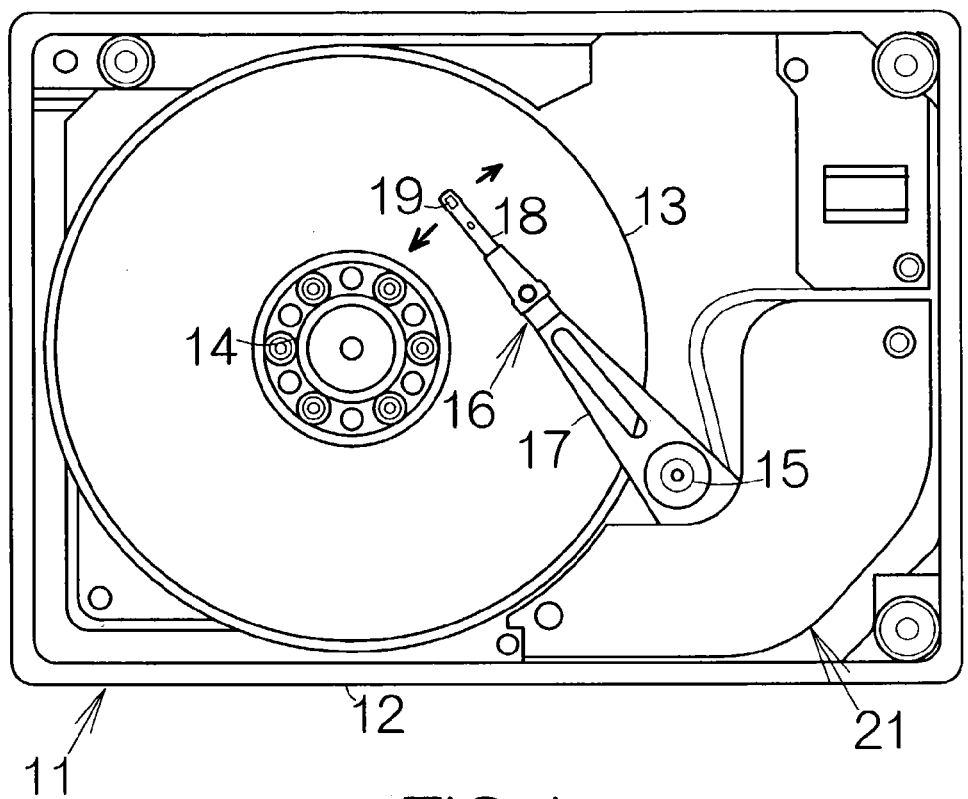
FIG. 1 is a plan view schematically illustrating the interior structure of a hard disk drive (HDD)

FIG. 1 schematically illustrates the inner structure of a hard disk drive (HDD) 11 as a specific example of a magnetic recording medium drive or storage device. The HDD 11 includes a box-shaped main enclosure 12 defining the inner space of a flat parallelepiped, for example. At least one magnetic recording disk 13 or recording medium is incorporated within the inner space. The magnetic recording disk 13 is mounted on the driving shaft of a spindle motor 14. The spindle motor 14 is allowed to drive the magnetic recording disk 13 for rotation at a higher revolution rate such as 7,200 rpm or 10,000 rpm, for example. A cover, not shown, is coupled to the main enclosure 12 so as to define the closed inner space between the main enclosure 12 and the cover itself.

A carriage 16 is also incorporated in the inner space of the main enclosure 12. The carriage 16 is designed to swing around a vertical support shaft 15. The carriage 16 includes a rigid actuator arm 17 extending in a horizontal direction from the support shaft 15, and an elastic head suspension 18 fixed to the tip end of the actuator arm 17. The elastic head suspension 18 extends forward from the actuator arm 17. As conventionally known, a flying head slider 19 is cantilevered at the tip end of the elastic head suspension 18 by a gimbal spring, not shown. The elastic head suspension 18 urges the flying head slider 19 toward the surface of the magnetic recording disk 13. When the magnetic recording disk 13 rotates, airflow is generated along the surface of the magnetic recording disk 13. The airflow serves to generate a lift on the flying head slider 19. The lift is balanced with the urging force from the elastic head suspension 18. The flying head slider 19 is thus allowed to keep flying with a relatively high stability when the magnetic recording disk 13 rotates.

When the carriage 16 is driven to swing around the support shaft 15 during flight of the flying head slider 19, the flying head slider 19 is allowed to cross the surface of the magnetic recording disk 13 in the radial direction. The radial movement brings the flying head slider 19 right above a target recording track on the magnetic recording disk 13. In this case, an electromagnetic actuator 21, such as a voice coil motor (VCM), may be employed to achieve the swinging movement of the carriage 16. In the case where two or more magnetic recording disks 13 are incorporated in the inner space of the main enclosure 12, a pair of elastic head suspensions 18, namely, the flying head sliders 19 are disposed between the adjacent magnetic recording disks 13, as conventionally known.

Figure 2:
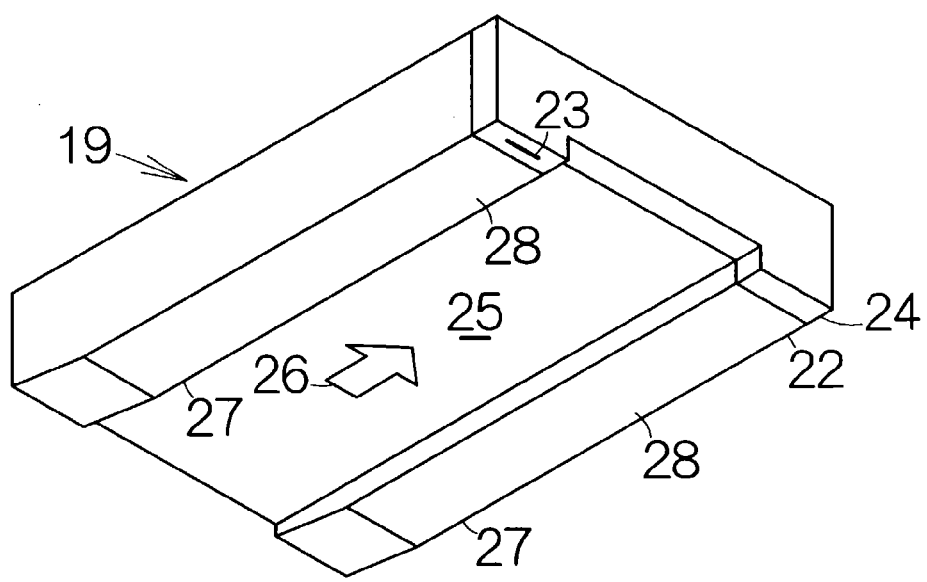
FIG. 2 is a perspective view schematically illustrating a flying head slider according to a specific example.

FIG. 2 illustrates a specific example of the flying head slider 19. The flying head slider 19 includes a slider body 22 made of $Al_2O_3$-TiC in the form of a flat parallelepiped. A head protection layer 24 made of $Al_2O_3$ is coupled to the outflow or trailing end of the slider body 22. A read/write electromagnetic head 23 is contained within the head protection layer 24. A medium-opposed surface or bottom surface 25 is defined over the slider body 22 and the head protection layer 24 so as to face the magnetic recording disk 13 at a distance. The bottom surface 25 is designed to receive airflow 26 generated along the surface of the rotating magnetic recording disk 13.

A pair of rails 27 are formed on the bottom surface 25. The rails 27 extend from the inflow or leading end to the outflow or trailing end. An air bearing surface (ABS) 28 is defined on the top surface of each of the rails 27. When the ABS 28 receives the airflow 26, the aforementioned lift is generated on the ABS 28. The front end of the read/write electromagnetic head 23 gets exposed at the ABS 28, as described later in detail. The exposed end of the read/write electromagnetic head 23 may be covered with a diamond-like carbon (DLC) protection film covering over the ABS 28. The flying head slider 19 may take any shape other than the above-described one.

Figure 3:
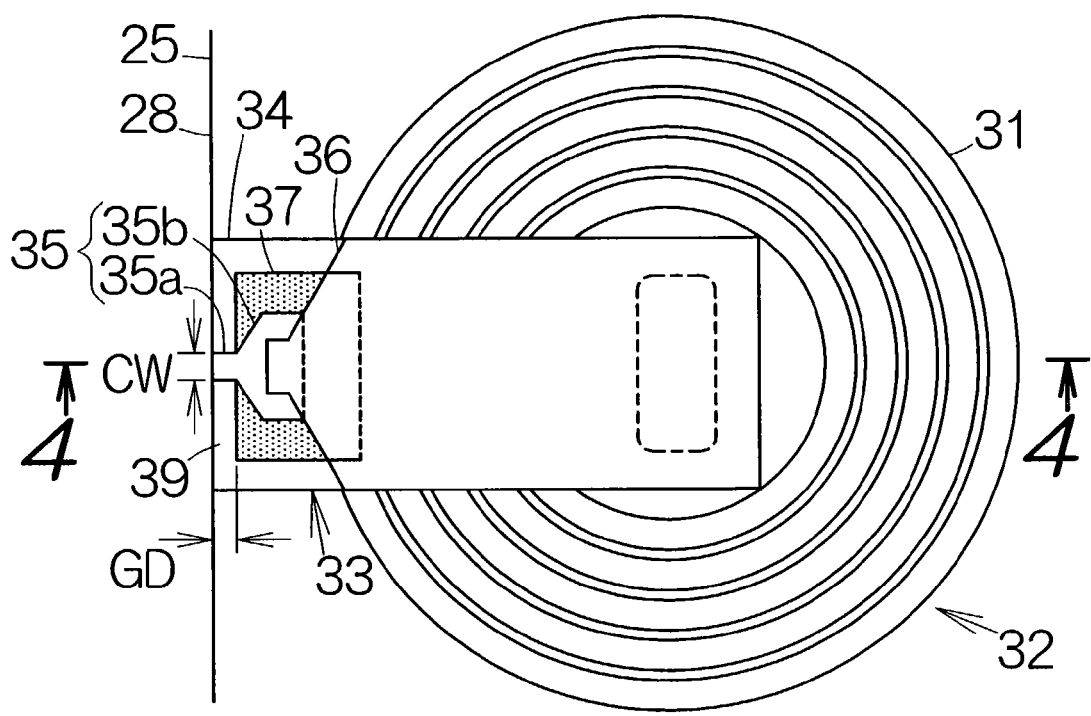
FIG. 3 is an enlarged plan view schematically illustrating the structure of a thin film magnetic head or inductive write head element according to a first embodiment of the present invention.

As shown in FIG. 3 in detail, the read/write electromagnetic head 23 includes an inductive write head element 32. The inductive write head element 32 serves as a thin film magnetic head according to a first embodiment of the present invention. A magnetic field is induced at a thin film swirly coil pattern 31 in the inductive write head element 31. The induced magnetic field is utilized to establish magnetic bit data on the magnetic recording disk 13. When an electric current is supplied to the swirly coil pattern 31, a magnetic field is induced at the swirly coil pattern 31. A magnetic flux is allowed to run through a magnetic core 33 penetrating through the central area of the swirly coil pattern 31. The swirly coil pattern 31 may be made of an electrically-conductive material such as Cu, for example.

Figure 4:
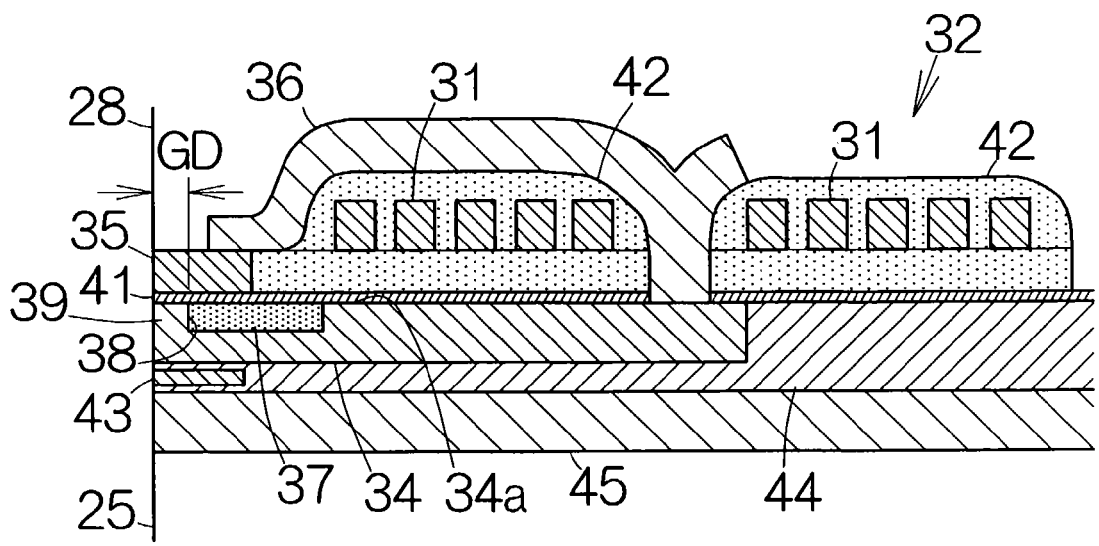
FIG. 4 is a sectional view taken along the line 4—4 in FIG. 3.

Referring also to FIG. 4, the magnetic core 33 includes a lower magnetic pole layer 34 extending rearward over a predetermined plane from the front end exposed at the bottom surface 25. The lower magnetic pole layer 34 is allowed to define a flattened upper surface 34a. The rear end of the lower magnetic pole layer 34 reaches at least the central area of the swirly coil pattern 31. The lower magnetic pole layer 34 may be made of a magnetic material such as NiFe, suitable to a plating process, or other materials suitable to a dry process such as sputtering, vapor-deposition, and the like.

An upper auxiliary magnetic pole 35 exposes the front end at the bottom surface 25. The upper auxiliary magnetic pole 35 is opposed to the flattened upper surface 34a of the lower magnetic pole layer 34. As is apparent from FIG. 3, the upper auxiliary magnetic pole 35 includes a front piece 35a extending by a constant core width CW in the back-and-forth or longitudinal direction, and a main body 35b continuous to the rear end of the front piece 35a and increasing the core width at a position remote from the rear end of the front piece 35a. The front piece 35a and the main body 35b may be integral. The neck height of the upper auxiliary magnetic pole 35 can be measured between the bottom surface 25 and a position where the core width starts increasing. In other words, the neck height of the upper auxiliary magnetic pole 35 corresponds to the length of the front piece 35a. The upper auxiliary magnetic pole 35 may be made of NiFe, for example.

An upper magnetic pole layer 36 extends forward from the central area of the swirly coil pattern 31 to the bottom surface 25. The front end of the upper magnetic pole layer 36 is received on the upper auxiliary magnetic pole 35. The front end of the upper magnetic pole layer 36 is terminated at a position spaced rearward from the bottom surface 25. The upper magnetic pole layer 36 may be made of NiFe, for example.

A non-magnetic material mass or piece 37 extends on the flattened upper surface 34a of the lower magnetic pole layer 34 in the lateral direction or in the direction of the core width at a position spaced rearward from the bottom surface 25. The non-magnetic material piece 37 defines the front end extending in parallel with the bottom surface 25. The front end of the non-magnetic material piece 37 keeps a constant gap depth GD from the bottom surface 25. As is apparent from FIG. 4, the non-magnetic material piece 37 is contained within a depression 38 formed on the flattened upper surface 34a of the lower magnetic pole layer 34. The non-magnetic material piece 37 defines the upper surface flush with the flattened upper surface 34a of the lower magnetic pole layer 34. The non-magnetic material piece 37 may be made of a hard-baked resin material such as a photoresist having been subjected to a hard-baking process, a non-magnetic metallic material such as $SiO_2$, and the like. A lower auxiliary magnetic pole 39 is carved out of the front end of the lower magnetic pole layer 34 between the bottom surface 25 and the depression 38. The wall surface of the depression 38 or the non-magnetic material piece 37 serves to define the rear end of the lower auxiliary magnetic pole 39.

As is apparent from FIG. 4, a non-magnetic gap layer 41 extends on the flattened upper surface of the lower magnetic pole layer 34. The non-magnetic gap layer 41 is interposed between the lower and upper auxiliary magnetic poles 39, 35 at the front end of the magnetic core 33 near the bottom surface 25. When the upper auxiliary magnetic pole 35 is opposed to the lower auxiliary magnetic pole 39 in the aforementioned manner, the lower auxiliary magnetic pole 39 solely serves to define the gap depth GD.

The aforementioned swirly coil pattern 31 is embedded within an insulating layer 42 swelling from the upper surface of the non-magnetic gap layer 41. The insulating layer 42 is interposed between the lower and upper magnetic pole layers 34, 46. The lower and upper magnetic pole layers 34, 36 are magnetically connected to each other at the central area of the swirly coil pattern 31.

The inductive write head element 32 is located on an $Al_2O_3$ (alumina) layer 44 containing a magnetoresistive (MR) element 43 for reading magnetic bit data out of the magnetic recording disk 13. The lower magnetic pole layer 34 of the inductive write head element 32 serves to hold the alumina layer 44 against a lower shield layer 45 made of FeN, NiFe, or the like. In this case, the lower magnetic pole layer 34 serves as an upper shield layer of the MR element 43. Accordingly, as shown in FIG. 3, for example, the lower magnetic pole layer 34 extends over a wider range in the lateral direction relative to the front piece 35a of the upper auxiliary magnetic pole 35 at the front end of the inductive write head element 32 near the bottom surface 25. A giant magnetoresistive (GMR) element or a tunnel-junction magnetoresistive (TMR) element may be employed as the MR element 43. It should be noted that the inductive write head element 32 may solely be employed without the MR element 43.

Now, when an electric current is supplied to the swirly coil pattern 31 in the inductive write head element 32, a magnetic field is induced at the swirly coil pattern 32. A magnetic flux is allowed to run from the central area of the swirly coil pattern 31 through the upper magnetic pole layer 36 or the lower magnetic pole layer 34. The magnetic flux can be exchanged between the upper and lower auxiliary magnetic poles 35, 39. The non-magnetic gap layer 41 serves to leak the exchanged magnetic flux out of the bottom surface 25 between the upper and lower auxiliary magnetic poles 35, 39. A magnetic field for recordation can be formed at the bottom surface 25 in this manner. The magnetic field for recordation serves to establish magnetization in the magnetic recording disk 13 at a position opposed to the bottom surface 25. A recording track of a width corresponding to the core width CW of the front piece 35a can thus be established on the magnetic recording disk 13. The width of the recording track can be reduced based on a smaller core width of the front piece 35a of the upper auxiliary magnetic pole 35.

The lower auxiliary magnetic pole 39 serves to establish a smaller gap depth GD irrespective of the extent or length of the upper auxiliary magnetic pole 35. The gap depth GD of a smaller amount contributes to concentration of the magnetic flux, exchanged between the upper and lower magnetic pole layers 36, 34, at the upper and lower auxiliary magnetic poles 35, 39. The magnetic flux is allowed to efficiently leak out of the bottom surface 25 between the upper and lower auxiliary magnetic poles 35, 39. A stronger magnetic field for recordation can be established. Moreover, even when the gap depth GD can be set smaller in the aforementioned manner, the length of the upper auxiliary magnetic pole 35 can be kept larger in the longitudinal direction. A larger contact area can be ensured between the upper auxiliary magnetic pole 35 and the upper magnetic pole layer 36. A magnetic saturation can sufficiently be suppressed at the boundary between the upper auxiliary magnetic pole 35 and the upper magnetic pole layer 36.

In particular, the aforementioned inductive write head element 32 positions the termination of the upper magnetic pole layer 36 at a position spaced rearward from the bottom surface 25. It is accordingly possible to prevent an undesirable magnetic flux from additionally leaking out of the bottom surface from the front end of the upper magnetic pole layer 36. Such an undesirable magnetic flux is expected to lead to an erroneous recordation or erasure of magnetic bit data.

Figure 5A:
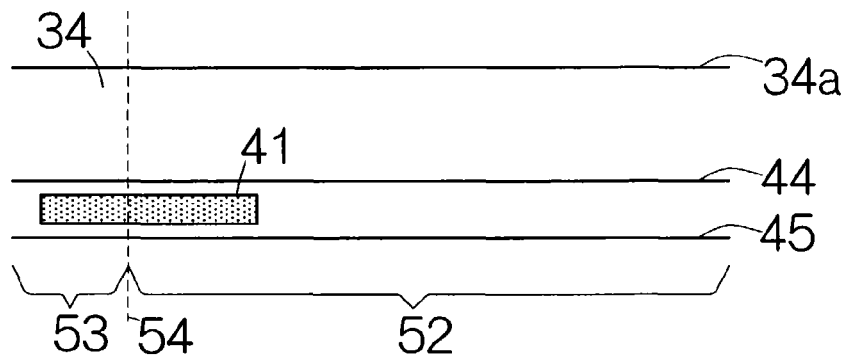
FIGS. 5A–5C are partial sectional views schematically illustrating a method of making the inductive write head element according to the first embodiment.

Next, a brief description will be made on a method of making the inductive write head element 32. The lower shield layer 45 and the MR element 43, as well as the alumina layer 44 containing the MR element 43 on the lower shield layer 45 are formed on a wafer made of $Al_2O_3$—TiC, for example, in a conventional manner. As shown in FIG. 5A, the wafer is divided into main sections 52 and marginal sections 53. The main sections 52 are finally cut out into the slider bodies 22. The marginal sections 53 are to be cut off when the slider bodies 22 are cut out of the wafer. A boundary 54 between the main section 52 and the marginal section 53 can be displaced in response to the amount of abrasion as described later in detail.

The lower magnetic pole layer 34 formed on the alumina layer 44 all over the main section 52 and the marginal section 53 in a conventional manner. A wet process such as plating or a dry process such as sputtering and vapor-deposition may be employed to deposit the lower magnetic pole layer 34, for example.

Any types of the material may be selected for the deposition of the lower magnetic pole layer 34. For example, if plating is employed, nickel iron (NiFe) may be selected. If sputtering or vapor-deposition is employed, an nitride or a composite material including a magnetic material and an oxide may be selected. FeN is a representative of the nitride expected to have a saturation magnetic flux density or saturation of magnetization Bs higher than that of NiFe, for example. NiFe—$Al_2O_3$ is a representative of the composite material expected to have a specific resistance higher than a simple NiFe. These nitride and composite material cannot be employed when plating is selected for deposition. Realization of a dry process in the above-described manner leads to a wider choice of the material for the lower magnetic pole layer 34 or the lower auxiliary magnetic pole 39.

Figure 5B:
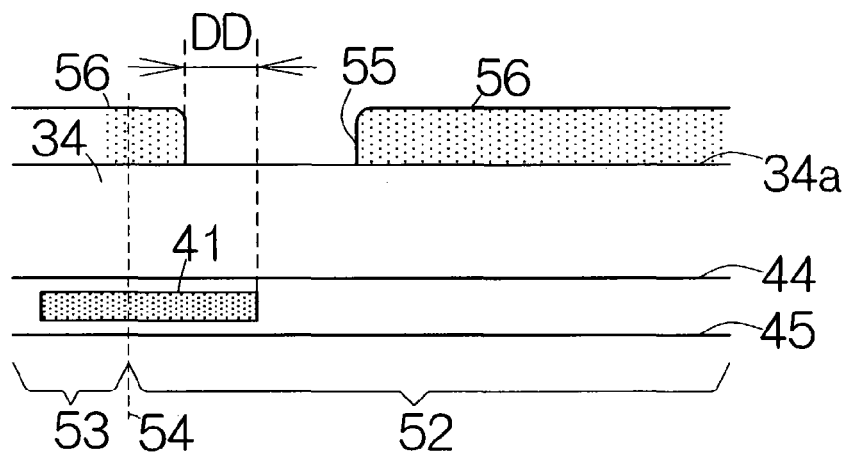

As shown in FIG. 5B, a photoresist film 56 is then formed to cover over the flattened upper surface 34a of the lower magnetic pole layer 34. The photoresist film 56 defines a void 55 corresponding to the shape of the aforementioned depression 38. The void 55 can be positioned at a relatively high accuracy based on alignment with the MR element 43. The alignment simply requires the establishment of space DD between the rear end of the MR element 43 and the front wall surface of the void 55.

Figure 5C:
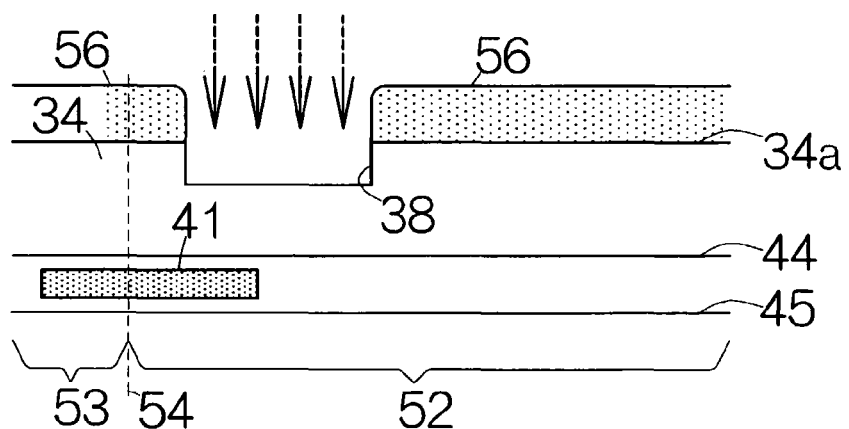

As shown in FIG. 5C, the lower magnetic pole layer 34 is then subjected to an ion milling process. The material is removed from the lower magnetic pole layer 34 within the void 55. The depression 38 can be formed in this manner on the flattened upper surface 34a of the lower magnetic pole layer 34 in accordance with the shape of the void 55. The rear end of the lower auxiliary magnetic pole 39 has been defined. The photoresist film 56 is then removed.

Figure 6A:
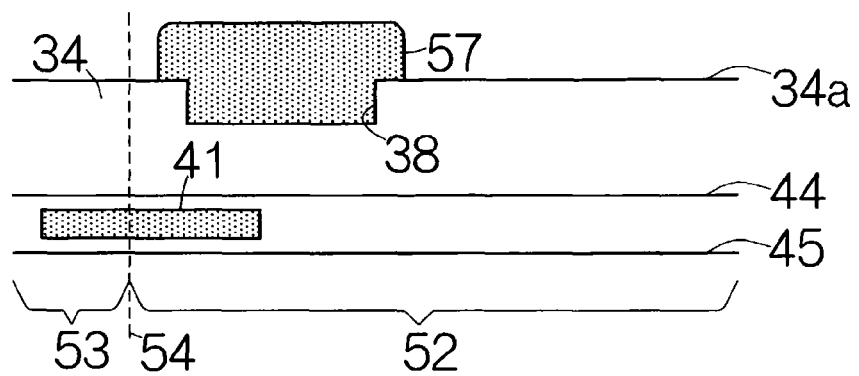
FIGS. 6A–6C are partial sectional views schematically illustrating the method of making the inductive write head element according to the first embodiment.

As shown in FIG. 6A, a photoresist film 57 is thereafter formed to cover over the upper surface of the lower magnetic pole layer 34. The depression 38 is filled up with the photoresist film 57. The photoresist film 57 may overswell out of the depression 38. Any voids should be prevented within the depression 38. The photoresist film 57 is then subjected to a thermal treatment or a hard-baking process. The photoresist film 57 consequently gets cured or hardened.

Figure 6B:
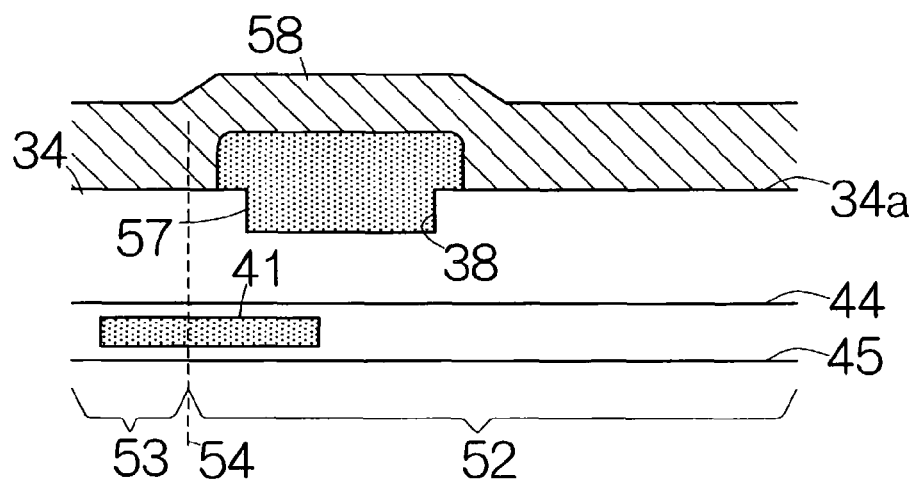

As shown in FIG. 6B, a protection film 58 of a constant thickness is then formed all over the upper surface of the lower magnetic pole layer 34. The protection film 58 may be made of an oxide material such as $SiO_2$, $Al_2O_3$, and the like. The protection film 58 covers over the hardened photoresist film 57.

Figure 6C:
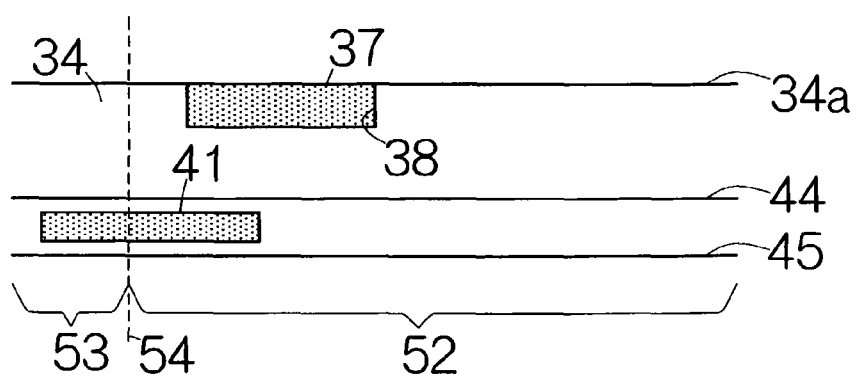

As shown in FIG. 6C, a flattening process is applied to the upper surface of the protection film 58 on the wafer. A chemical mechanical polishing process (CMP) may be employed in this case. The flattening process should be terminated when the photoresist film 57 is exposed in the depression 38. The non-magnetic material piece 37 has thus been formed within the depression 38. The non-magnetic gap layer 41, the upper auxiliary magnetic pole 35, the swirly coil pattern 31, the insulating layer 42 and the upper magnetic pole layer 36 are subsequently formed on the wafer. The read/write electromagnetic head 23 has been obtained in this manner.

Finally, the individual flying head sliders 19 are cut out of the wafer. The aforementioned marginal sections 53 are removed so that the bottom surface 25 is exposed. The amount of abrasion may be set based on the electrical resistance of the MR element 43 as well known in the art. Since the front end of the non-magnetic material piece 37 can be positioned at a relatively higher accuracy based on the alignment with the MR element 43, the gap depth GD can be set at a higher accuracy as expected in the lower auxiliary magnetic pole 39.

Figure 7A:
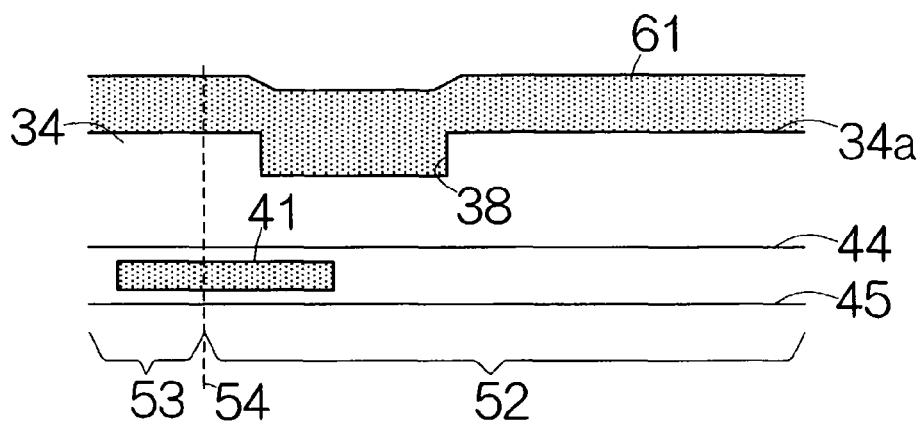
FIGS. 7A–7C are partial sectional views schematically illustrating the method of making the inductive write head element, employing a non-magnetic metallic material for a non-magnetic material piece in place of a photoresist film.
Figure 7B:
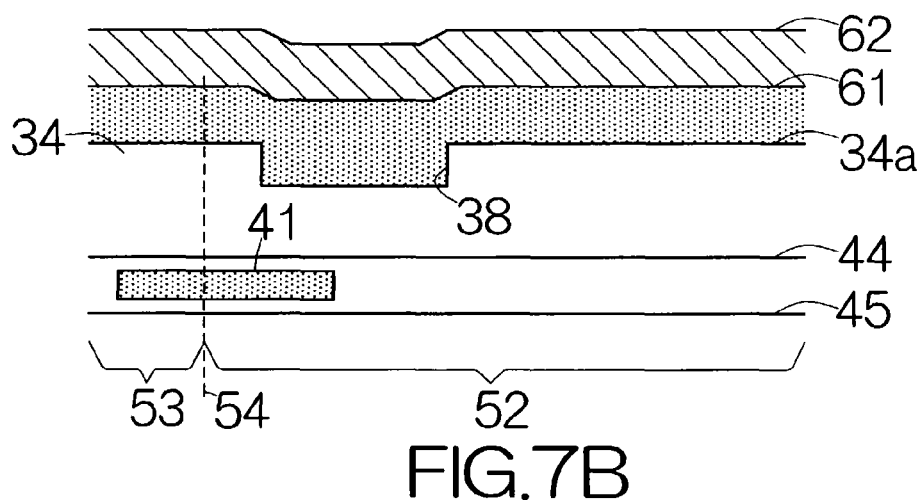

Next, a brief description will be made on a method of making the non-magnetic material piece 37 comprising, in place of the aforementioned photoresist film 57, a non-magnetic metallic material including at least one element selected from a group consisting of Cu, Ag, Au and Pt. When the rear end of the lower auxiliary magnetic pole 39 have been engraved in the aforementioned manner, a non-magnetic metallic film 61 of a constant thickness is deposited on the upper surface of the lower magnetic pole layer 34, as shown in FIG. 7A. A wet process such as electrolyte or non-electrolyte plating may be employed to deposit the non-magnetic material, for example. Employment of the wet process leads to a complete filling of the non-magnetic metallic film 61 within the depression 38. No voids may remain even at the corners of the depression 38. As shown in FIG. 7B, a protection film 62 of a constant thickness is thereafter formed to cover over the upper surface of the non-magnetic metallic film 61. The protection film 62 may be made of an oxide material such as $SiO_2$, $Al_2O_3$, and the like. The protection film 62 covers all over the upper surface of the non-magnetic metallic film 61.

Figure 7C:
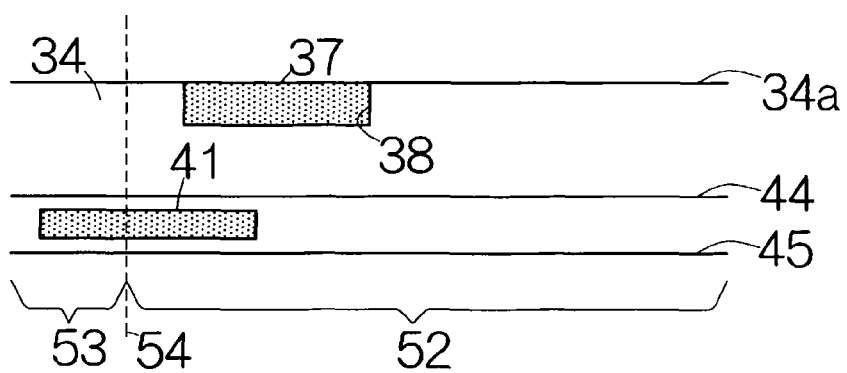

As shown in FIG. 7C, a flattening process is applied to the upper surface of the protection film 62 on the wafer. A chemical mechanical polishing process (CMP) may be employed in this case. The flattening process should be terminated when the non-magnetic metallic film 61 is exposed in the depression 38. The non-magnetic material piece 37 has thus been formed within the depression 38. The non-magnetic material piece 37 made of the non-magnetic metallic material is expected to absorb the eddy current induced in the magnetic core 33 when signals of a higher frequency is supplied to the inductive write head element 32. The magnetic field for recordation can thus be enhanced.

Figure 8:
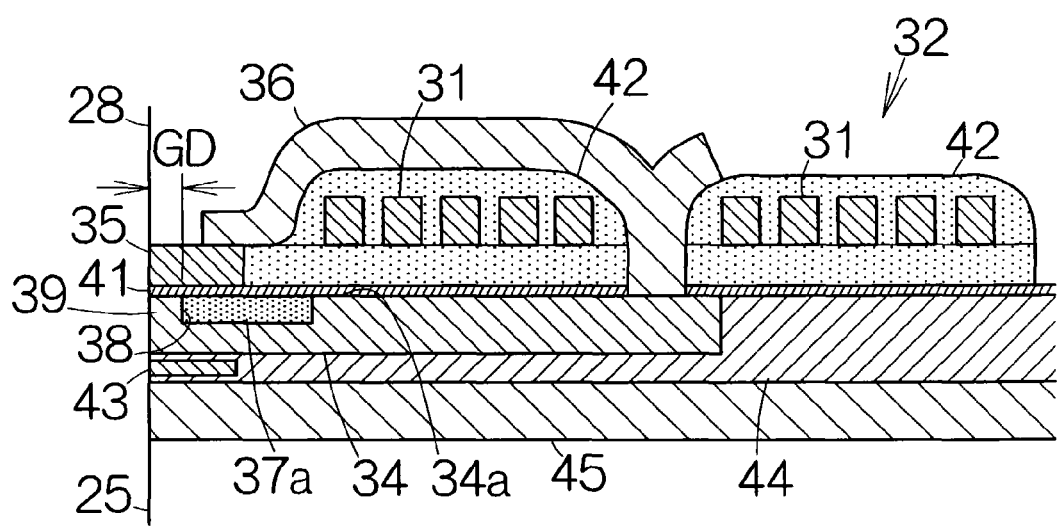
FIG. 8 is a sectional view, corresponding to FIG. 4, schematically illustrating a thin film magnetic head or inductive write head element according to a second embodiment of the present invention.

FIG. 8 schematically illustrates a thin film magnetic head or inductive write element 32a according to a second embodiment of the present invention. A non-magnetic region 37a is defined in the lower magnetic pole layer 34 in the second embodiment. The non-magnetic region 37a extends in the lateral direction or the direction of the core width at a position spaced rearward from the bottom surface 25. The non-magnetic region 37a defines the front end extending in parallel with the bottom surface 25. A constant space corresponding to the gap depth GD is established between the bottom surface 25 and the front end of the non-magnetic region 37a. The non-magnetic region 37a may be established based on the non-magnetic element material doped into the lower magnetic pole layer 34. The lower auxiliary magnetic pole 39 is defined at the front end of the lower magnetic pole layer 34 between the bottom surface 25 and the non-magnetic region 37a. The front boundary of the non-magnetic region 37a serves to define the rear end of the lower auxiliary magnetic pole 39. The non-magnetic region 37a achieves the same advantages as the aforementioned non-magnetic piece 37. Like reference numerals are attached to the structures or components identical to those of the aforementioned first embodiment.

Figure 9A:
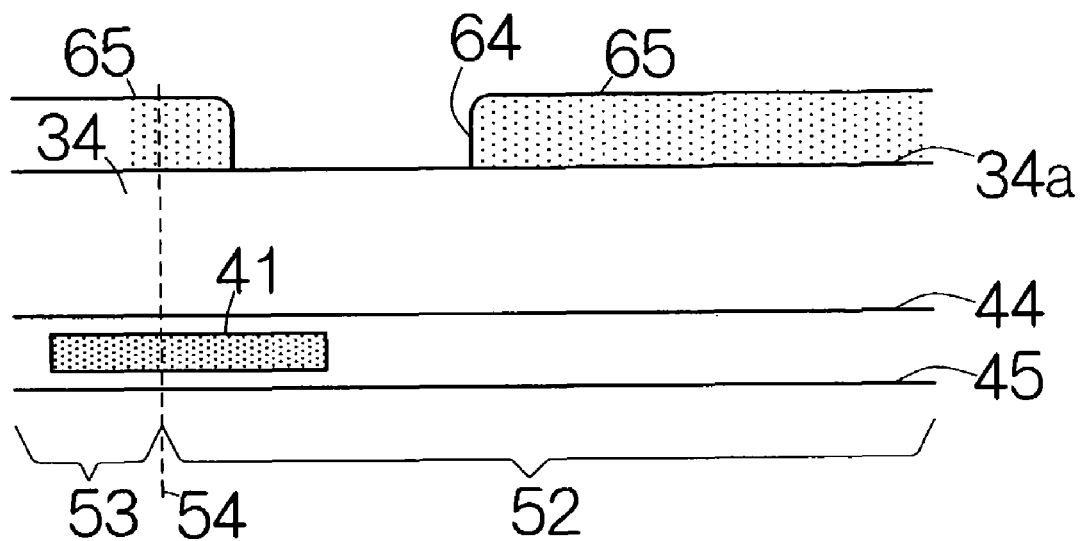
FIGS. 9A and 9B are partial sectional views schematically illustrating a method of making the inductive write head element according to the second embodiment.

An ion doping process may be utilized to form the inductive write head element 32 of the type. Specifically, when the lower magnetic pole layer 34 has been formed over the wafer as described above, a photoresist film 65 is formed on the exposed surface of the lower magnetic pole layer 34, as shown in FIG. 9A, for example. The photoresist film 65 serves to define a void 64 corresponding to the shape of the non-magnetic region 37a. The void 64 can be positioned at a relatively higher accuracy based on the alignment with the MR element 43 in the aforementioned manner.

Figure 9B:
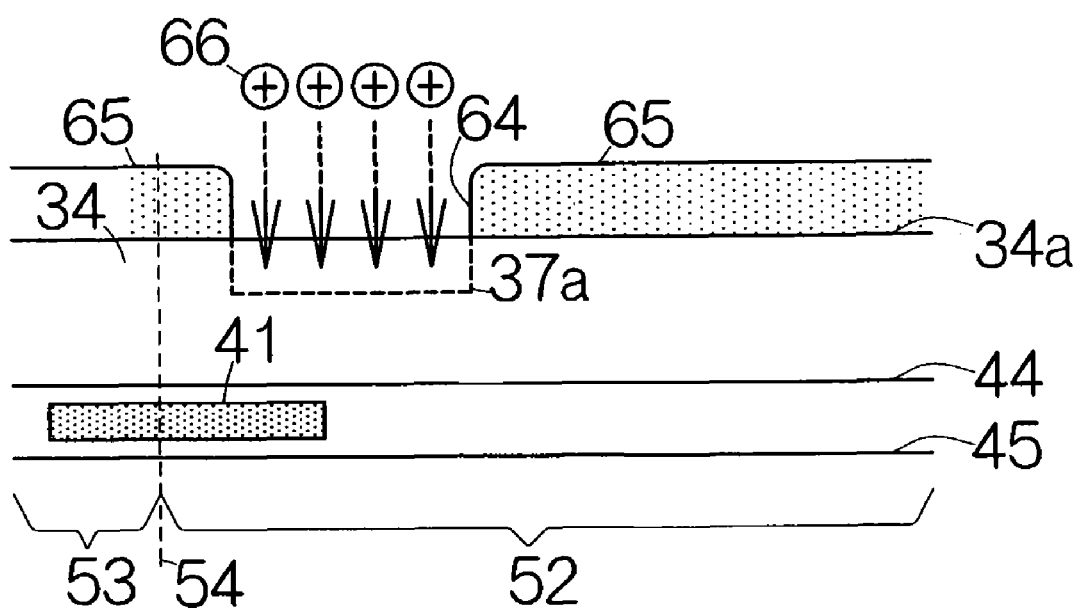

As shown in FIG. 9B, the lower magnetic pole layer 34 is then subjected to an ion doping process. Non-magnetic element ions 66 are allowed to fall on and collide against the wafer. The non-magnetic element ions 66 are doped by an ion implantation method into the lower magnetic pole layer 34 within the void 64. The lower magnetic pole layer 34 is converted into the non-magnetic region 37a in accordance with the shape of the void 64. The rear end of the lower auxiliary magnetic pole 39 can be defined in this manner. The photoresist film 65 may be removed after the non-magnetic element ions 66 have completely been doped.

In this second embodiment, a wet process such as plating or a dry process such as sputtering and vapor-deposition may be employed to deposit the lower magnetic pole layer 34, in the same manner as described above. Any types of the material may likewise be selected for the deposition of the lower magnetic pole layer 34. Realization of a dry process in the above-described manner leads to a wider choice of the material for the lower magnetic pole layer 34 or the lower auxiliary magnetic pole 39.

What is claimed is:

1. A thin film magnetic head comprising:
a lower magnetic pole layer extending rearward from a front end exposed at a medium-opposed surface, said lower magnetic pole layer being made of a nitride;
a depression located on an upper surface of the lower magnetic pole layer;
a lower auxiliary magnetic pole defined in the lower magnetic pole layer between the medium-opposed surface and the depression;
a non-magnetic mass embedded in the depression; and
an upper magnetic pole opposing a front end to the lower auxiliary magnetic pole at the medium-opposed surface.

2. The thin film magnetic head according to claim 1, wherein said non-magnetic mass is made of a resin material.

3. The thin film magnetic head according to claim 1, wherein said non-magnetic mass is made of a non-magnetic metallic material.

4. The thin film magnetic head according to claim 1, wherein the lower magnetic layer and the lower auxiliary magnetic pole are formed based on one of sputtering and vapor-deposition.

5. A thin film magnetic head comprising:
a lower magnetic pole layer extending rearward from a front end exposed at a medium-opposed surface, said lower magnetic pole layer being made of a composite material comprising a magnetic material and an oxide;
a depression located on an upper surface of the lower magnetic pole layer;
a lower auxiliary magnetic pole defined in the lower magnetic pole layer between the medium-opposed surface and the depression;
a non-magnetic mass embedded in the depression; and
an upper magnetic pole opposing a front end to the lower auxiliary magnetic pole at the medium-opposed surface.

6. The thin film magnetic head according to claim 5, wherein said non-magnetic mass is made of a resin material.

7. The thin film magnetic head according to claim 5, wherein said non-magnetic mass is made of a non-magnetic metallic material.

8. The thin film magnetic head according to claim 5, wherein the lower magnetic layer and the lower auxiliary magnetic pole are formed based on one of sputtering and vapor-deposition.

* * * * *